(12) United States Patent
Nedeltchev et al.

(10) Patent No.: US 9,952,908 B2
(45) Date of Patent: Apr. 24, 2018

(54) CROWD SOURCED CLOUD COMPUTING

(71) Applicant: Cisco Technology, Inc., San Jose, CA (US)

(72) Inventors: Plamen Nedeltchev, San Jose, CA (US); John Christopher Cottrell, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 240 days.

(21) Appl. No.: 14/851,437

(22) Filed: Sep. 11, 2015

(65) Prior Publication Data

US 2016/0080477 A1 Mar. 17, 2016

Related U.S. Application Data

(60) Provisional application No. 62/049,350, filed on Sep. 11, 2014.

(51) Int. Cl.
*G06F 9/50* (2006.01)
*H04L 29/06* (2006.01)
*H04L 29/08* (2006.01)

(52) U.S. Cl.
CPC ........ *G06F 9/5072* (2013.01); *H04L 65/1059* (2013.01); *H04L 67/02* (2013.01);
(Continued)

(58) Field of Classification Search
CPC .................................................... G05F 9/5072
See application file for complete search history.

(56) References Cited

U.S. PATENT DOCUMENTS 7,069,560 B1 * 6/2006 Cheyer ................... G06F 9/465
709/202
7,515,899 B1 * 4/2009 Carr ...................... G06F 9/5072
455/403

(Continued)

FOREIGN PATENT DOCUMENTS

WO 0114961 A2 3/2001
WO 2016040889 A1 3/2016

OTHER PUBLICATIONS

Marosi, et al., "Towards a Volunteer Cloud System", Future Generations Computer System, vol. 29, No. 6, Mar. 27, 2012, pp. 1442-1451.

(Continued)

*Primary Examiner* — Jimmy H Tran
(74) *Attorney, Agent, or Firm* — Johnson, Marcou & Isaacs, LLC (57) ABSTRACT

A first party, such as a residential subscriber to an Internet Service Provider (ISP), logically partitions its computing resources into an end user partition and a crowd sourced cloud partition. The first party installs a crowd sourced cloud application in each cloud partition. Together, a cloud provider computing system and each cloud application orchestrate cloud services over a communications network, such as the Internet. For each crowd sourced cloud application, orchestration involves registering cloud services with the cloud provider, provisioning each registered cloud service that is requested by the cloud provider, and operating each provisioned service. For the cloud provider, orchestration involves publishing each registered service as available to crowd sourced cloud users, receiving requests for cloud services from a crowd sourced cloud user, and requesting, from a crowd sourced cloud application, a registered service responsive to the request for cloud services.

20 Claims, 6 Drawing Sheets

(52) U.S. Cl.
CPC .......... *H04L 67/10* (2013.01); *H04L 67/1097* (2013.01); *H04L 67/16* (2013.01)

(56) References Cited

U.S. PATENT DOCUMENTS

| | | | | |
|---|---|---|---|---|
| 7,870,044 B2* | 1/2011 | Robertson | ............ | G06Q 20/102 705/1.1 |
| 8,001,232 B1* | 8/2011 | Saulpaugh | .............. | G06F 9/465 709/203 |
| 8,296,765 B2* | 10/2012 | Kurdi | .................... | G06F 9/5072 709/201 |
| 8,793,313 B2* | 7/2014 | Kern | .................. | H04L 63/0407 709/204 |
| 8,793,478 B2* | 7/2014 | Jaber | ..................... | G06F 9/5072 713/2 |
| 8,935,366 B2* | 1/2015 | Mehr | .................. | G06F 11/1458 709/220 |
| 9,401,954 B2 | 7/2016 | Jagana | | |
| 9,531,745 B1 | 12/2016 | Sharma | | |
| 9,628,379 B2* | 4/2017 | Nedeltchev | ........... | H04L 45/502 |
| 9,848,041 B2 | 12/2017 | Einkauf | | |
| 2002/0019844 A1* | 2/2002 | Kurowski | ............. | G06F 9/5072 709/201 |
| 2003/0115374 A1* | 6/2003 | Waldo | ................... | G06F 9/4411 719/316 |
| 2005/0081097 A1* | 4/2005 | Bacher | ................ | G06F 11/2023 714/13 |
| 2006/0031509 A1* | 2/2006 | Ballette | ................ | G06F 9/5072 709/226 |
| 2007/0276899 A1* | 11/2007 | Martin | .................... | G06F 9/465 709/201 |
| 2008/0162637 A1* | 7/2008 | Adamczyk | ............ | H04L 51/043 709/204 |
| 2008/0276249 A1* | 11/2008 | Dynarski | .............. | H04L 12/189 719/313 |
| 2009/0171855 A1* | 7/2009 | Hubbard | ............ | G06Q 10/0631 705/80 |
| 2009/0265473 A1* | 10/2009 | Hydrie | .................. | H04L 67/104 709/229 |
| 2010/0077069 A1* | 3/2010 | Kim | ...................... | G06F 9/5072 709/223 |
| 2010/0248698 A1* | 9/2010 | In | .......................... | G06F 9/5072 455/414.1 |
| 2010/0281095 A1* | 11/2010 | Wehner | ................. | G06F 9/5072 709/201 |
| 2011/0055399 A1* | 3/2011 | Tung | ..................... | G06F 9/5072 709/226 |
| 2011/0138047 A1 | 6/2011 | Brown | | |
| 2011/0153812 A1* | 6/2011 | Yoon | ..................... | G06F 9/5072 709/224 |
| 2012/0198075 A1* | 8/2012 | Crowe | ................ | H04L 67/2847 709/226 |
| 2012/0246322 A1* | 9/2012 | Patil | ...................... | G06F 9/5027 709/226 |
| 2013/0318241 A1 | 11/2013 | Acharya | | |
| 2014/0047526 A1* | 2/2014 | Huang | .................. | H04L 63/083 726/7 |
| 2015/0007185 A1* | 1/2015 | Dey | ...................... | G06F 9/4843 718/102 |
| 2015/0134396 A1 | 5/2015 | Mukherjee | | |
| 2015/0334696 A1 | 11/2015 | Gu | | |
| 2016/0080477 A1 | 3/2016 | Nedeltchev | | |
| 2016/0140359 A1* | 5/2016 | Mukherjee | .......... | G06F 21/6263 726/26 |
| 2016/0301661 A1* | 10/2016 | Poirier | ................ | H04L 61/2528 |
| 2018/0013696 A1 | 1/2018 | Nedeltchev | | |
| 2018/0025399 A1 | 1/2018 | Nedeltchev | | |

OTHER PUBLICATIONS

Wirtz, "International Search Report and Written Opinion issued in International Application No. PCT/US2015/049823,", dated Jan. 5, 2016, 13 pages.
"How BOINC works", https://boinc.berkeley.edu/wiki/How_BOINC_works, Jul. 21, 2013, 2 pages.
"VXLAN Overview: Cisco Nexus 9000 Series Switches", http://www.cisco.com/c/en/us/products/collateral/switches/nexus-9000-series-switches/white-paper-c11-729383.html, Feb. 15, 2014, 7 pages.
Jariwala, "11 Cloud OS (Operating Systems) you might want to give a try", http://www.techstagram.com/2013/09/19/8-cloud-os/, Sep. 19, 2013, 9 pages.
Mahalingam, et al., "VXLAN: A Framework for Overlaying Virtualized Layer 2 Networks over Layer 3 Networks draft-mahalingam-dutt-dcops-vxlan-02", draft-mahalingam-dutt-dcops-vxlan-02—Virtual eXtensible Local Area Network (VXLAN): A Framework for Overlaying Virtualized Layer 2 Networks, Aug. 22, 2012, 20 pages.
Verma, et al., "An architecture for Load Balancing Techniques for Fog Computing Environment", vol. 6, No. 2, Apr.-Sep. 2015 pp. 269-274, 6 pages.
U.S. Appl. No. 15/214,003 to Nedeltchev et al. filed Jul. 19, 2016.
U.S. Appl. No. 15/203,767 to Nedeltchev et al. filed Jul. 6, 2016.
Wittmann-Regis, "International Preliminary Report on Patentability issued in International Application No. PCT/US2015/049823", dated Mar. 14, 2017, 8 pages.
Symantec Corporation: "E-security begins with sound security policies", Announcement Symantec, Jun. 14, 2001; XP002265695.
Alecu, "Extended European Search Report for EP 17178569.4;", dated Dec. 22, 2017, 9 pages.
Anonymous:, "Service catalog—Wikipedia," Sep. 14, 2015, pp. 1-5, Retrieved from the Internet: URL:https://en.wikipedia.org/w/index.php?title=Service catalog&oldid=681033936 [retrieved on Nov. 30, 2017].
Dieben, "Extended European Search Report for EP 17180851.2;", Dec. 19, 2017, 10 pages.
Widhalm De Rodrig, "Office Action issued U.S. Appl. No. 15/203,767 filed Jul. 6, 2016," dated Feb. 8, 2018, 13 pages.

* cited by examiner

CROWD SOURCED CLOUD COMPUTING

CROSS REFERENCE TO RELATED APPLICATION

This application claims the benefit of U.S. Provisional Patent Application No. 62/049,350, filed Sep. 11, 2014, entitled "Crowd-Sourced Cloud Computing," the complete disclosure of which is hereby fully incorporated herein by reference.

TECHNICAL FIELD

The disclosed technology relates to delivery of computing as a service. In particular, example embodiments relate to partitioning and operating a portion of computing resources not traditionally used in a cloud fashion as resources available as a service.

BACKGROUND

"Cloud computing" refers to a model for enabling ubiquitous, convenient, on-demand network access to a shared pool of configurable computing resources (e.g., networks, servers, storage, applications, and services) that may be rapidly provisioned and released with minimal management effort or service provider interaction. The cloud computing model is characterized by on-demand self-service, broad network access, resource pooling, rapid elasticity, and measured service. Cloud computing service models include software as a service (SaaS), platform as a service (PaaS), and infrastructure as a service (IaaS). Cloud computing deployment models include public clouds, private clouds, community clouds, and hybrid combinations thereof. The cloud model can allow end users to reduce capital expenditures and burdensome operating costs associated with maintaining substantial information technology expertise and operating staff in house.

DETAILED DESCRIPTION OF EXAMPLE EMBODIMENTS

Embodiments of the present technology introduce a new cloud computing deployment model involving a cloud provider and a plurality of cloud resource owners. In such a model, computing resources of each of a plurality of first parties, such as residential subscribers to an Internet Service Provider (ISP), can be logically partitioned into a first party end user partition and a first party crowd sourced cloud partition. A crowd sourced cloud application can be installed in each first party crowd source cloud partition. Orchestration of the cloud can proceed in a cloud provider computing system and in each crowd sourced cloud application. In each crowd-sourced cloud application, orchestration can include registering at least one cloud service of the first party crowd source cloud partition with the cloud provider computing system, receiving a request for registered crowd sourced cloud services from the cloud provider computing system, provisioning each registered crowd sourced cloud service requested by the cloud provider computing system, and operating each provisioned service. In the cloud provider computing system, orchestration can include publishing each registered cloud service as available to crowd sourced cloud user computing systems, receiving requests for cloud services from a crowd sourced cloud user computing system, and requesting a registered crowd sourced cloud service from a crowd sourced cloud application of a particular first party computing resource responsive to the request for cloud services from the crowd sourced cloud user computing system.

Typical network architectures may be designed for centralized and static, location-specific, client-server ("north-south") environments. Such networks may be designed for traffic patterns originating from the corporate environment and that primarily traverse a corporate edge. Such an approach may enable service offerings, including cloud services, from centralized Data Center (DC) locations to remote branch partner, or home locations. While "home" is used for simplicity in the present disclosure, other entities such as businesses, schools, and universities, could all participate in a crowd sourced cloud as providers of services, capacity, or both. These entities can provide one or more devices or appliances (hereinafter "computing resources") that can provide compute, network, or storage capacity in a context of space, power, and cooling. For example, as the computing power of vehicles increases, vehicles may be able to participate in a crowd sourced cloud as providers of services and capacity).

Real-time communications and peer-to-peer traffic patterns are increasingly mobile, and applications are increasingly cloud-based. That design changes the typical traffic patterns from north-south to more bidirectional "east-west," and allows a service provider to offer mobile services from large cloud locations. In 2018, it is expected that up to 60% of data may be resident in decentralized computing with the combination of DC-based data, public and hybrid clouds, and fog clouds. Fog computing is a paradigm that extends cloud computing and services to the edge of the network. Similar to cloud computing, fog computing can provide data, compute, storage, and application services to end-users.

At the same time, the power of traditional end user environments (south) is exploding. Some estimate that the compute power of the equivalent of a personal computer, such as found in the typical home environment, in 2049 may be equal to all computing power created through 2012. Further, the ability of home environments to offer services and products (south-to-north, south-to-west, and south-to-east traffic) may expand; similarly to how people offer home-generated electrical power to public utilities. This trend opens the door for "utility computing," where the consumer can share the excess of his home cloud or IT infrastructure with peers, Internet Service Providers (ISPs), application providers, or third parties. This capability effectively may transform the consumer of goods and services into a "prosumer"—a market resident who owns a home infrastructure and allocates part of it to create a cloud and offer services and products to peers, ISPs, application providers, or third parties. In some embodiments, it allows customers to become entrepreneurs and de-facto application providers and/or crowd-sourced public cloud providers.

Embodiments of the disclosed technology can extend the multi-provider network notion into a small cloud, partitioning part of the home infrastructure environment into both home network and home cloud, and thus enabling combinations of residential cloud-based services between three groups of entities—ISPs, application providers (such as home security application providers), and peers.

Example System Architectures

In example architectures for the technology, while each server, system, and device shown in the architecture is represented by one instance of the server, system, or device, multiple instances of each can be used. Further, while certain aspects of operation of the technology are presented in examples related to the figures to facilitate enablement of the claimed invention, additional features of the technology, also facilitating enablement of the claimed invention, are disclosed elsewhere herein.

Figure 1:
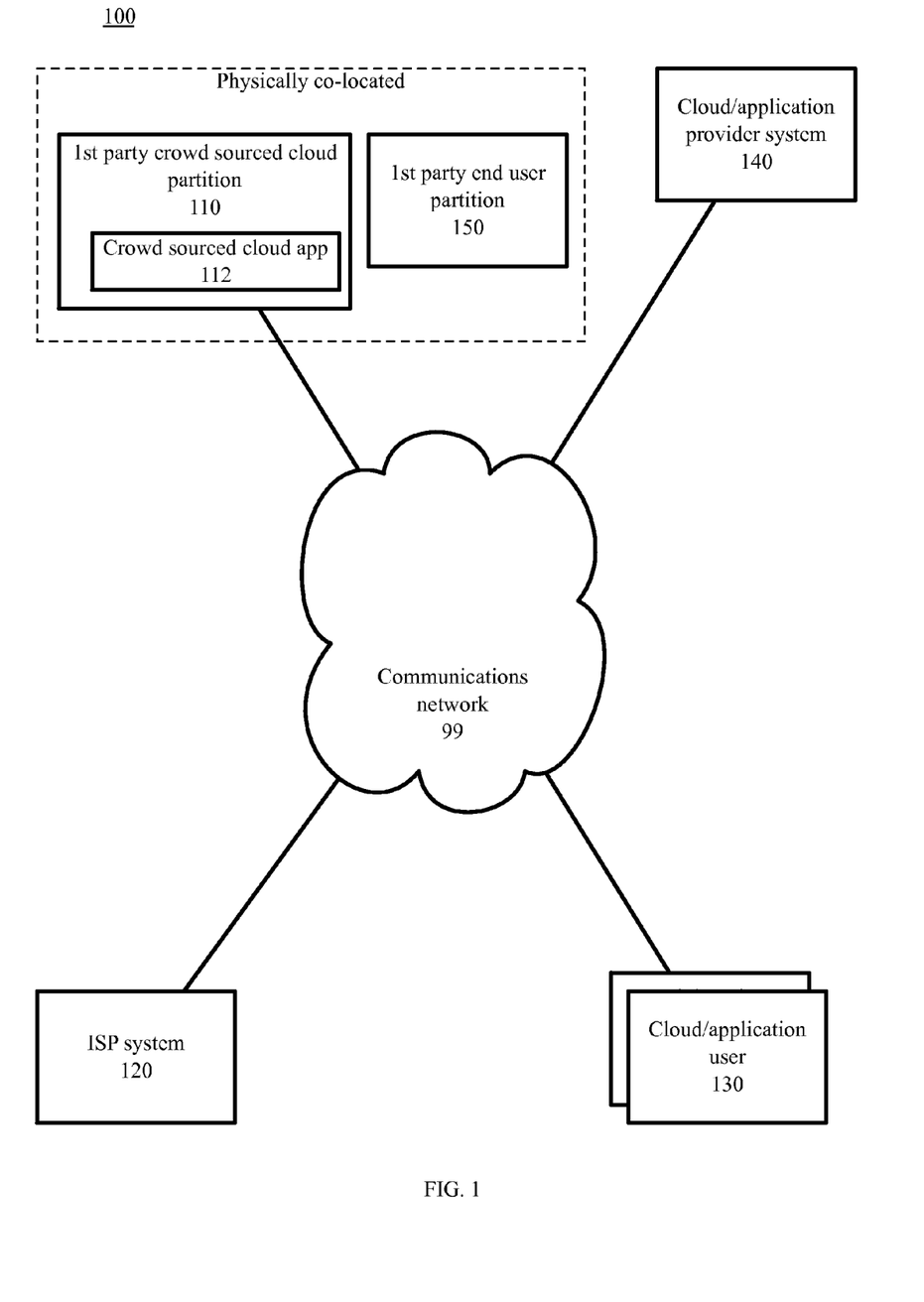
FIG. 1 is a block diagram depicting a communications and processing architecture, in accordance with certain example embodiments.

As depicted in FIG. 1, the architecture 100 includes network computing devices 110, 120, 130, and 140, each of which may be configured to communicate with one another via communications network 99. Network computing device 110 can include a crowd source cloud application 112 for participation as a computing resource in a crowd sourced cloud. A first party end user partition 150 can be physically co-located with each network computing device 110. In some embodiments, a user associated with a device must install an application and/or make a feature selection to obtain the benefits of the technology described herein.

Network 99 includes one or more wired or wireless telecommunications means by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device can include a communication module capable of transmitting and receiving data over the network 99. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device. In some embodiments, network device 110 may be a partition on an end user's computing resource, network device 120 may be an ISP system, network device 140 may be a cloud provider computing system or application provider system, and network device 130 may be a cloud user system or application user system.

The network connections illustrated are example and other means of establishing a communications link between the computers and devices can be used. Moreover, those having ordinary skill in the art having the benefit of this disclosure will appreciate that the network devices illustrated in FIG. 1 may have any of several other suitable computer system configurations. For example, one or both of network device 110 and network device 130 can be embodied as a mobile phone or handheld computer may not include all the components described above.

Figure 6:
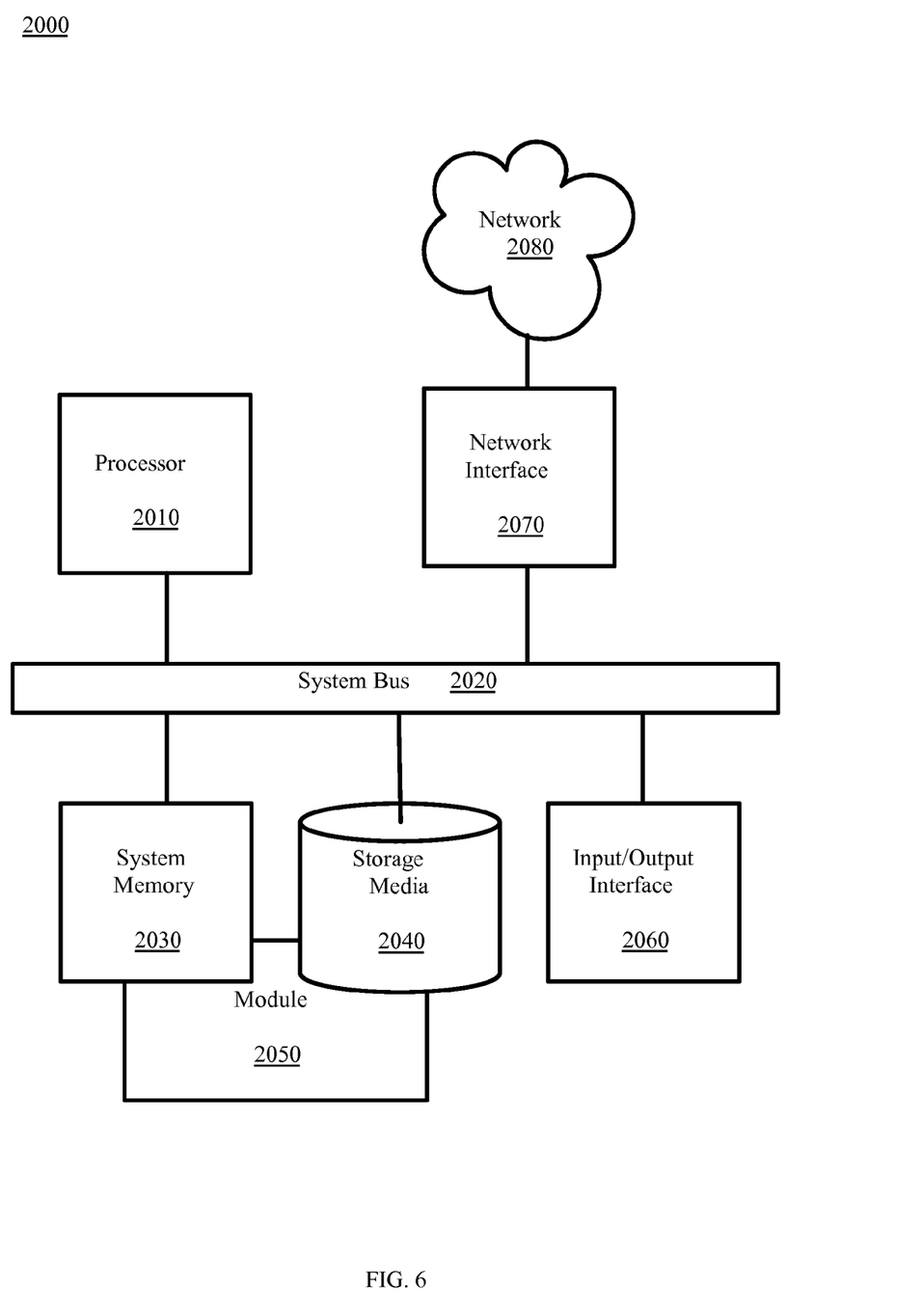
FIG. 6 is a diagram depicting a computing machine and a module, in accordance with certain example embodiments.

In example embodiments, the network computing devices, and any other computing machines associated with the technology presented herein, may be any type of computing machine such as, but not limited to, those discussed in more detail with respect to FIG. 6. Furthermore, any functions, applications, or modules associated with any of these computing machines, such as those described herein or any others (for example scripts, web content, software, firmware, or hardware) associated with the technology presented herein may by any of the modules discussed in more detail with respect to FIG. 6. The computing machines discussed herein may communicate with one another as well as other computer machines or communication systems over one or more networks, such as network 99. The network 99 may include any type of data or communications network, including any of the network technology discussed with respect to FIG. 6.

EXAMPLE EMBODIMENTS

The example embodiments illustrated in the following figures are described hereinafter with respect to the components of the example operating environment and example architecture described elsewhere herein. The example embodiments may also be practiced with other systems and in other environments.

Figure 2:
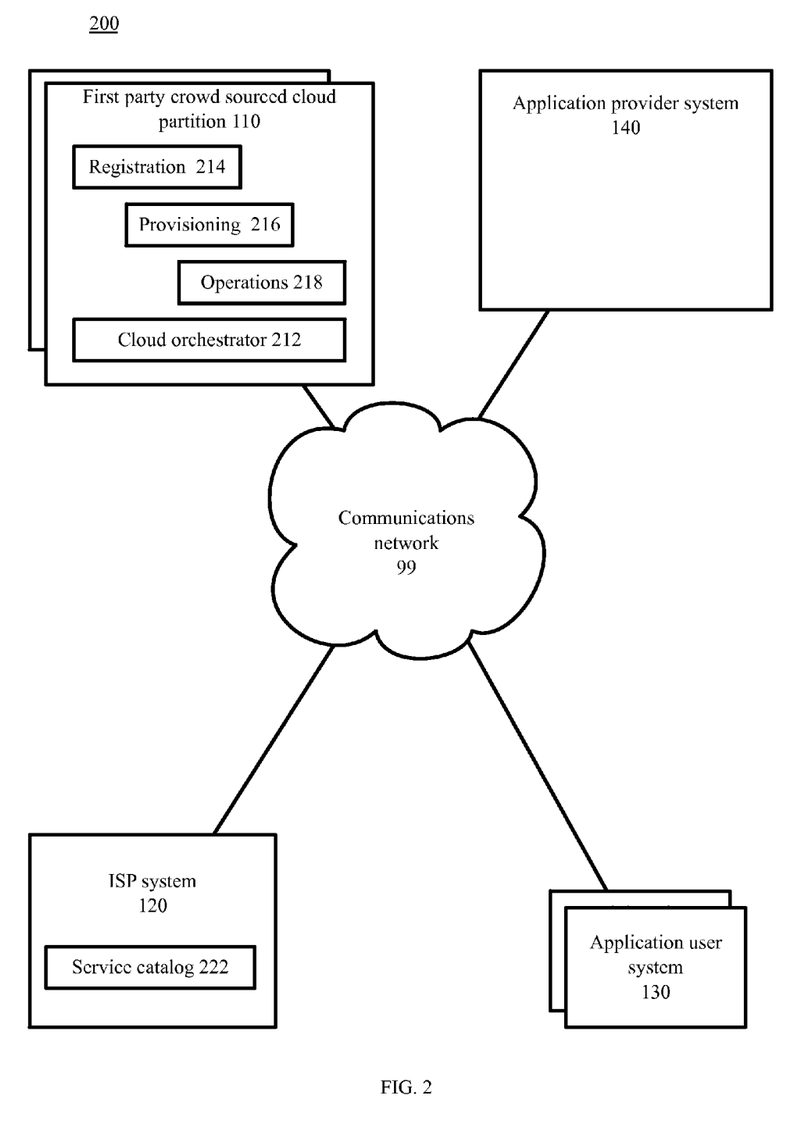
FIG. 2 is a block diagram depicting a model of crowd-sourced cloud computing, in accordance with certain example embodiments.

FIG. 2 is a block diagram depicting a model 200 of crowd-sourced cloud computing, in accordance with certain example embodiments. In the example embodiment depicted in FIG. 2, each of a plurality of home cloud owners offers cloud services from his home cloud partition 110 and advertises the services to application provider systems 140 through ISP system 120.

In the example embodiment of FIG. 2, each home cloud partition 110 and each co-located first party end user partition 150 (not shown in FIG. 2) coexist in the home environment isolated from each other. This environment is designed to allow each home cloud partition 110 to offer services as a service owner to application providers 140. This example embodiment supports one ISP system 120 and one or multiple application provider systems 140. Each home cloud partition 110 is isolated from the first party end user partition 150 (not shown in FIG. 2) and is managed as a separate entity offered with service level agreement (SLA) to per-subscription consumers, including the ISP and each application provider depending on the agreement(s) between the parties. The home ("first party") crowd sourced cloud partition 110 includes a first party crowd sourced cloud orchestrator 212, which includes cloud service registration 212, provisioning 214, and operations 216 elements.

This architecture enables orchestration in the home cloud partition 110, instead of solely in the cloud provider's system, which is different than in typical cloud structures where the cloud provider's system orchestrates cloud operations from a central data center. This architecture places cloud orchestration functionality such as registration, provisioning, and operation, directly on the home cloud partition 110.

This solution can be used, for example, in remote tutoring like Scholastic Aptitude Test (SAT) prep or Test of English as Foreign Language (TOEFL) prep classes, or remote tax prep services provided by a tax professional, or in house sharing services. For example, an application provider system 140, such as an SAT application provider system, can access to a dynamic supply of residential computing resources such as home cloud partition 110 made available through a cloud provider computing system such as an ISP system 120. In such an example, separate SLAs can be established, in one instance between each residential computing resources owner and the cloud provider, and in the other instance between the SAT application provider and the cloud provider. The implementation of the crowd source cloud 200 as between the cloud provider and the residential computing resources owners can be hidden from the SAT application provider. Services on residential cloud computing resources 110 can be registered/unregistered as available resources, and can be dynamically provisioned in a manner not visible to the SAT application provider system 140, or the users of the SAT application. The cloud provider, not only the SAT application provider, can gain the benefit of reducing capital expenditures, while the residential computing resources owner can gain the benefit of fuller use of the residential computing resources 110 and 150.

Figure 3:
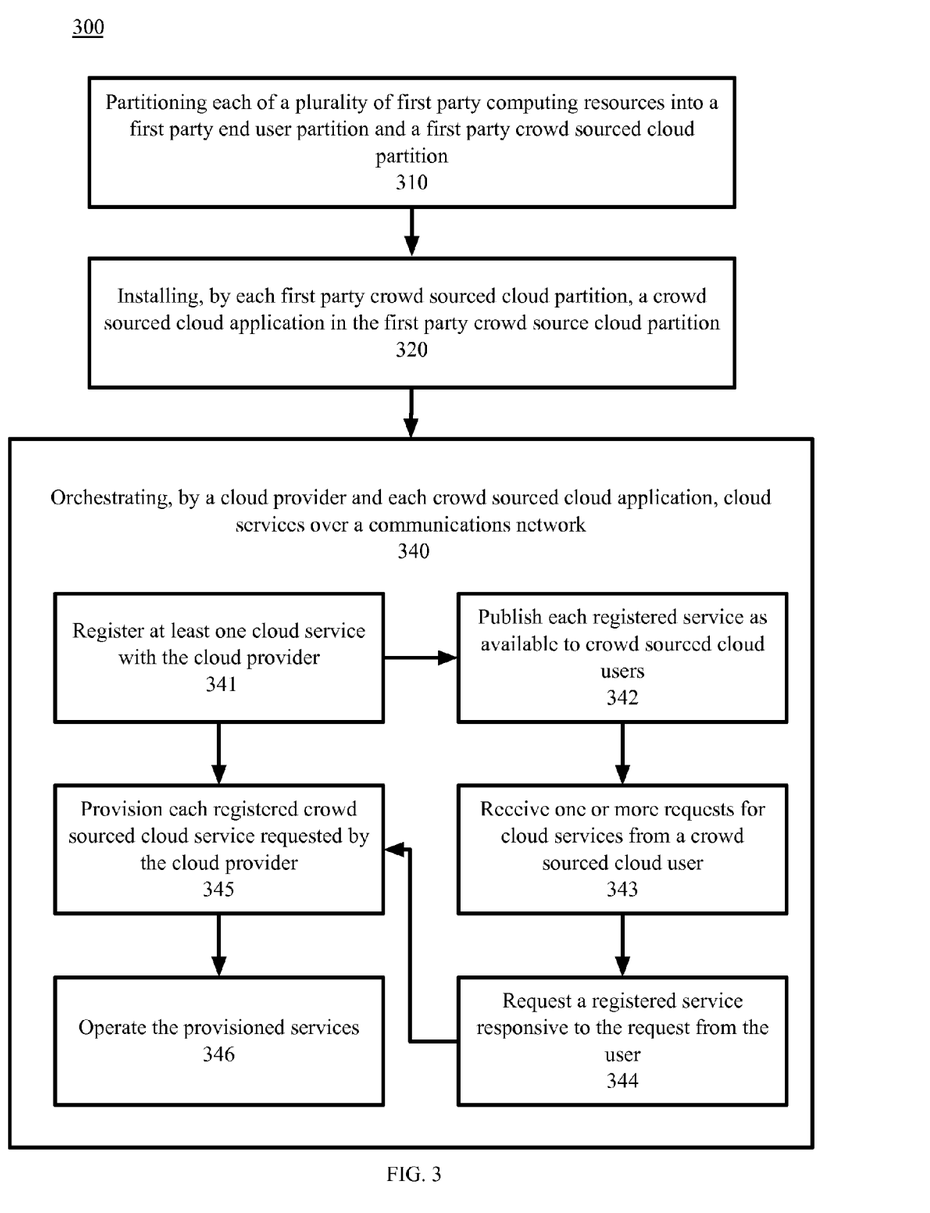
FIG. 3 is a block flow diagram depicting a method to deliver computing as a service, in accordance with certain example embodiment.

FIG. 3 is a block flow diagram depicting a method 300 to deliver computing as a service, in accordance with certain example embodiments. In such a method 300, each of a plurality of first party computing resources can be partitioned into a first party end user partition and a first party crowd sourced cloud partition—Block 310. The computing resources can be logically partitioned such that a subset of the first party computing resources are virtualized as separate from those resources not part of the partition 110, including hosting a separate operating system. The first party crowd sourced cloud partition 110 can be physically partitioned or isolated, for example, through assignation of a separate IP address. In either event, the computing resources 110 to be used to participate in the crowd sourced cloud operate with a separate operating system and are isolated from the end user resources 150 in the same location. In some embodiments, the number of cloud partitions 110 can be equal to the number of separate services to be offered, or separate tenants to be accommodated. In the example of FIG. 2, each of a plurality of residential subscribers to an ISP partitions his personal computer into two partitions—an end user partition 150 under a first operating system and a crowd sourced cloud partition 110.

A crowd sourced cloud application is installed in the first party crowd source cloud partition—Block 320. In the example of FIG. 2, the residential ISP subscriber installs a crowd sourced cloud orchestrator 212 into the crowd sourced cloud partition 110, along with a Linux OS virtual machine. The crowd sourced cloud orchestrator 212 program includes functionality for registration 214 of computing resources with a cloud provider, provisioning 216 of registered resources, and operating 218 of provisioned resources, in cooperation with the cloud provider ISP system 120 and a cloud user system. In the example of FIG. 2, the ISP system 120 is the cloud provider, and the application provider system 140, established to provide an SAT prep application to end users via application user systems 130, is the cloud user system. In another example, a cloud provider computing system, such as the ISP system 120, remotely installs a crowd sourced cloud application 212 in the first party crowd sourced cloud partition 110. Distributing some orchestration functions across crowd source cloud computing resource system can offload some cloud management tasks from the cloud provider.

A cloud provider computing system and each crowd sourced cloud application orchestrates cloud services over a communications network—Block 340. In the example of FIG. 2, along with the cloud orchestrator 212 in crowd sourced cloud partition 110 of the residential ISP subscriber, the ISP system 120 orchestrates cloud services available to cloud users, such as the SAT prep application provider system 140, over the Internet 99.

As part of orchestration via the communications network, the crowd sourced cloud application registers at least one cloud service with the cloud provider—Block 341. A service is registered so that the cloud provider can indicate the services availability to users, and so that the cloud provider can perform the cloud provider's share of cloud orchestration tasks. In the example of FIG. 2, the registration functionality 214 of each cloud orchestrator 212 running in a first party crowd sourced cloud partition 110 registers the Linux OS virtual machine with the ISP system 120. Other services, such as a software application, can be registered.

As part of orchestration, the cloud provider publishes each registered service as available to crowd sourced cloud users—Block 342. In the example of FIG. 2, the ISP system 120 publishes a service catalog 222 containing an entry for the Linux OS virtual machine installed in the first party crowd sourced cloud partition 110. The cloud service catalog 222 contains a list of cloud services, such as the Linux OS virtual machine. A cloud user can request a published cloud service, for example a cloud service published in a catalog of cloud services through a web self-service portal over the Internet. The service catalog 222 can act as the ordering portal for cloud end users, including pricing and service-level commitments, and the terms and conditions for service provisioning. The service catalog 222 is a provisioning interface to automated service fulfillment using a cloud orchestration subsystem across the cloud provider (in this example the ISP system 120) and a plurality of first party crowd sourced cloud partitions 110.

As part of orchestration, the cloud provider receives one or more requests for cloud services from a crowd sourced cloud user—Block 343. In the example of FIG. 2, the application provider system 140, having access to the service catalog 222 over the Internet 99, can request the Linux virtual machine services from the ISP system 120. Note that the specific first party crowd source cloud partition 110 providing the Linux virtual machine services may not be indicated in the service catalog 242. In the example of FIG. 2, the ISP system 120 provides a layer of abstraction isolating the application provider system 140 from the details of which first party is providing the crowd sourced cloud services.

The cloud provider requests, from the first party crowd sourced cloud partition, the registered service corresponding to the received request for cloud services—Block 344. In the example of FIG. 2, the ISP system 120 requests the Linux virtual machine services installed in the residential subscriber's partition 110 for an SAT prep course provider application of the application provider system 140. For example, the ISP system 120 can send a message to the cloud orchestrator 212 in the first party partition 110 requesting that the provisioned Linux virtual machine service be operated for a specific application provider system 140.

The first party crowd sourced cloud partition provisions each registered crowd sourced cloud service requested by the cloud provider computing system—Block 345. In the example of FIG. 2, the orchestrator 212 running in the residential subscriber's partition 110 provisions the Linux virtual machine services for use by the SAT prep course application of the application provider system 140, as requested via the ISP cloud provider 120.

The first party crowd sourced cloud partition 110 operates each provisioned service—Block 346. In the example of FIG. 2, the Linux virtual machine in the residential subscriber's partition 110 executes the code for at least a portion of the SAT prep course application of the application provider system 140 under the management of the operations functionality 218. Such operation can include dynamic allocation of resources in the partition 110, for example the allocation of more memory to the portion of the SAT prep course application executing in the Linux virtual machine in the residential subscriber's partition 110. At the level of the cloud provider, in this case the ISP system 120, the SAT prep course application of the application provider system 140 could be allocated computing resources across a plurality of first party partitions 110. For example, as new SAT prep course end users are added. Such an allocation can be dynamic, as in other cloud implementations, based on the cloud user's demand and based on the availability of first party computing resources partitioned for the purpose of sharing via the cloud.

Operational metrics of the first party partition 110 can be monitored, for example, by the cloud orchestrator 112, as compared to the requirements of a service level agreement in place between each first party partition owner, the ISP, and the cloud/application provider system operator. Further, an accounting of the provided services can be maintained—including, in some cases, an accounting for services that are merely registered. Some combination of the ISP system operator and the application provider system operator can compensate the home cloud owner for the use of first party partition 110 cloud services. Compensation can be in various forms, including bartering for similar services, credit toward ISP or application provider debits of the first party partition owner, or cash payments. Each step of the first party partition owner can be performed using an application provided to the owner.

Figure 4:
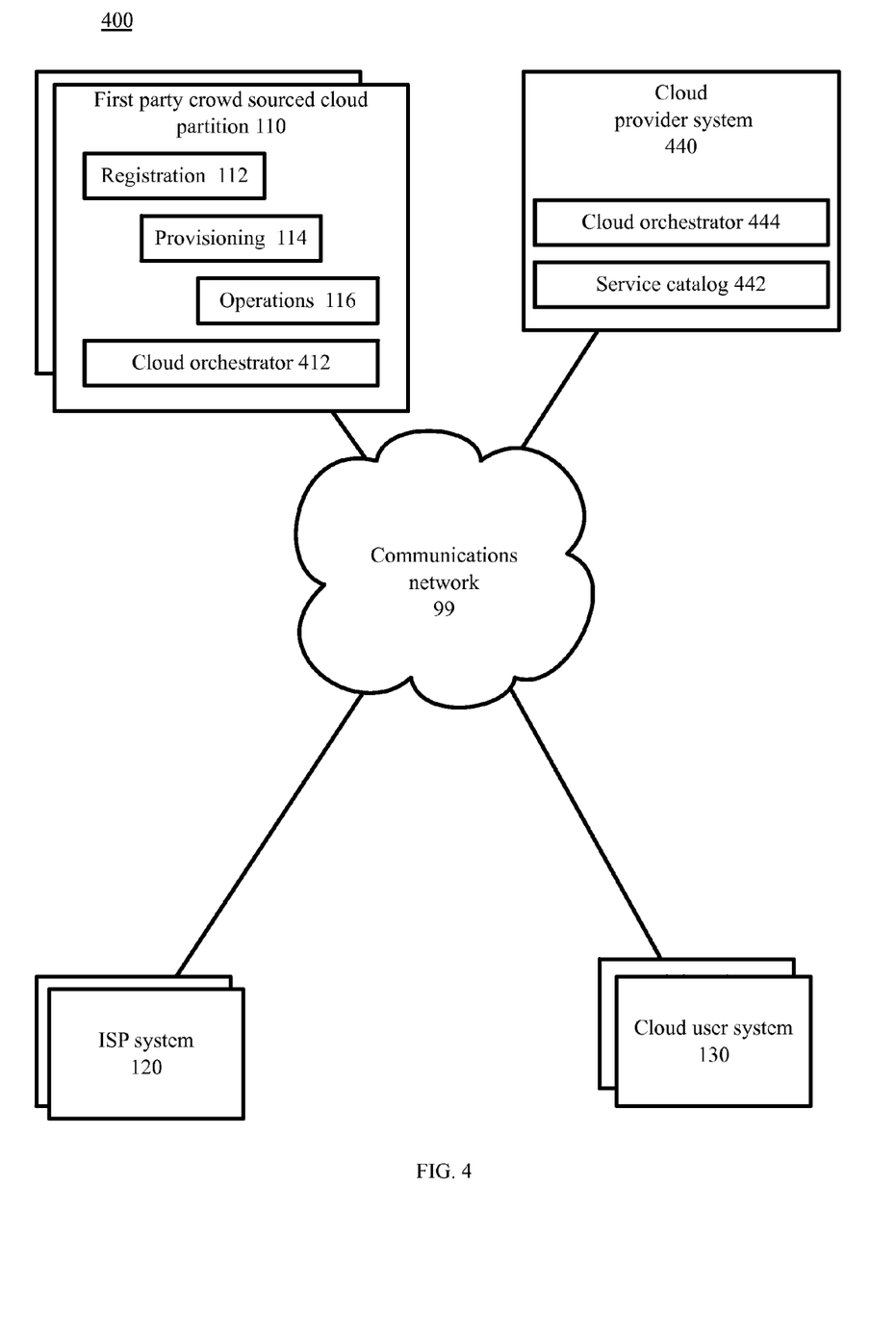
FIG. 4 is a block diagram depicting a model of crowd-sourced cloud computing, in accordance with certain example embodiments.

Referring to FIG. 4, a block diagram depicting a model 400 of crowd-sourced cloud computing, in accordance with certain example embodiments is shown. The model 400 of crowd sourced cloud computing involves a plurality of home cloud owners each making his home cloud partition 110 available to cloud users via one or more ISPs and a cloud provider computing system 440. Here, each home cloud 110 is offered as a service to cloud users for a fee. Each first party crowd sourced cloud partition 110 offers XaaS ("anything (X) as a Service") to a cloud provider computing system 440, which can be offered by the cloud provider computing system 440 to one or more cloud user systems 130 for hosting and processing services and products. The process of the registration and provisioning is substantially the same as in the first embodiment, but the cloud provider computing system 440 publishes a service catalog 442 of cloud services to be offered to cloud user systems 130 with a particular SLA for a fee. The cloud provider computing system 440 orchestrates, using cloud orchestrator 444 in cooperation with the orchestrator 412 of partition 110, provisioning of home cloud services for each user with speed (up and down), size of the available storage, compute power, and SLA of services provided, as well as fees for the service and together with protocols allowing an XaaS to be offered to third parties to conduct distributed computing and processing based on different criteria.

This model is suitable for, among other things, offering distributed processing and services that can be optimized for speed, volume, scale and resiliency, cost, and regulatory compliance—for example, distributed neighborhood theft protection systems, or cluster, city or municipality county relevant services. In such applications, locally storing data (specifically locally significant data) and processing data closer to the source can be combined with uploading only metrics for pattern calculations. For example, each of cloud user systems 130, cloud provider computing system 440, and each partition 110 can be in the same neighborhood and services by the same wideband ISP system 120. Multiple cases exist in this category. One such case involves bitcoin mining, which may be very computational intensive and is typically more convenient for every participant when done in "mining pools."

Figure 5:
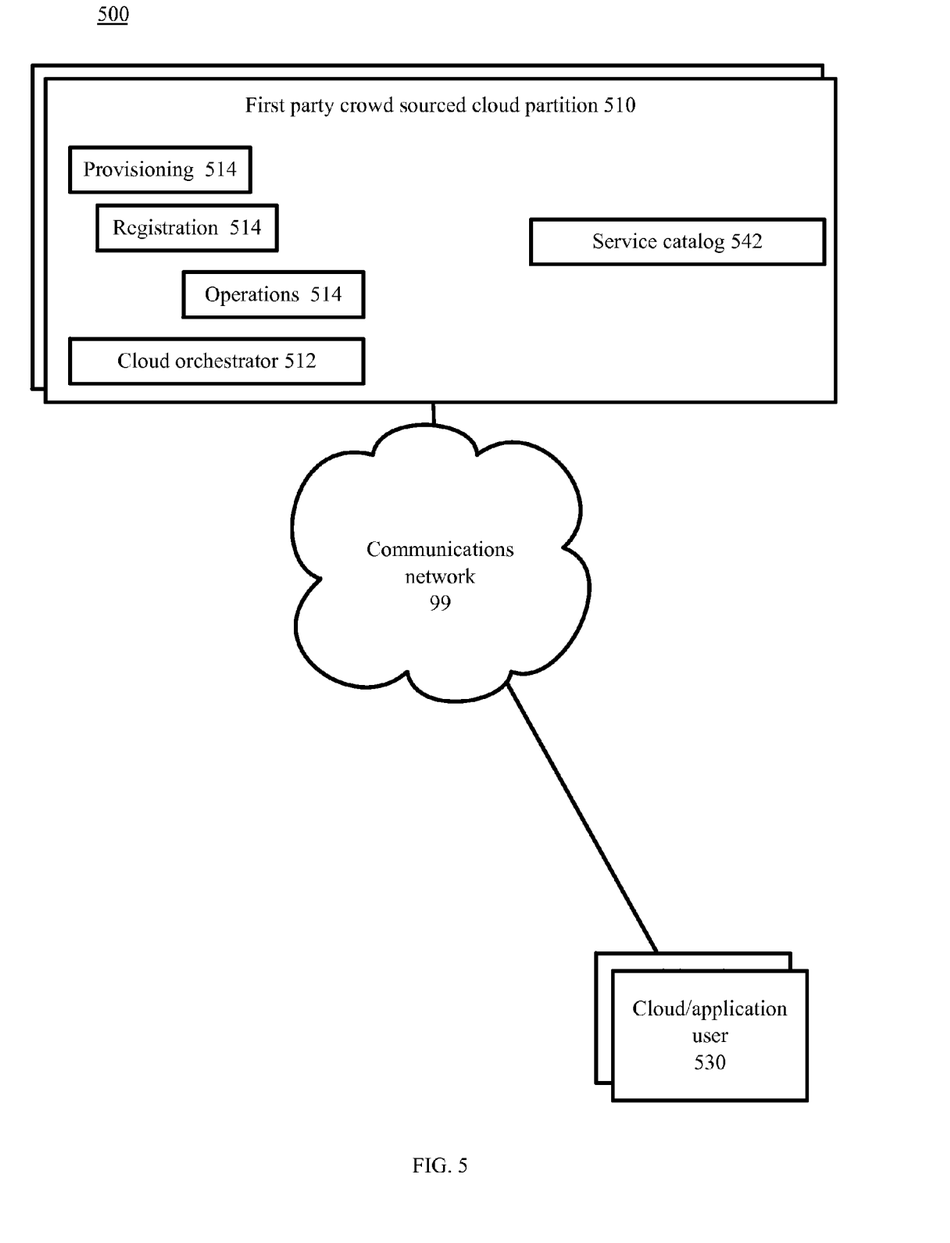
FIG. 5 is a block diagram depicting a model of crowd-sourced cloud computing, in accordance with certain example embodiments.

Referring to FIG. 5, a third example embodiment 500 describes cases when the service catalog 542 and the orchestration 512 are hosted out of the first party crowd sourced cloud partition 510. In such embodiments, the network connectivity 99 is based on peer-to-peer network services (of spatial scope less than or equal to a local area network) that in dense neighborhoods could be based on pervasive Wi-Fi local areas wireless technology connectivity. In other examples, the peer-to-peer connection can include one or more of a ZigBee®, Z-Wave™, 6LoWPAN, and similar communications networking technology. A 6LoWPAN network technology communications network 99 can offer the opportunity to achieve isolation without partitioning by assigning an IPV6 IP address to each network host.

Wi-Fi connections represent a service owner/provider model, a "zero marginal cost" service consumption model in which little or zero additional costs exist for ongoing provision of cloud computing services for the service provider who already has most, if not all, the infrastructure in place. In each of the examples of FIG. 4 and FIG. 5, the home cloud can include cloud support applications for network partitioning and network management.

The provisioning system and the service catalog are located in one of the first party crowd sourced cloud partitions 510, which offers services or products out of its home cloud and offers that to its peers, by-passing the ISP service provider and application service providers. The peers subscribe directly to the service catalog 542 of the first party crowd sourced cloud partition 510 of the service owner and use services for a fee. Here, the service owner can support any one to many type of protocol with its peers, and a many-to-many type of protocol by aggregating first party crowd sourced cloud partitions of other neighbors.

The technology described herein can enable the Internet service provider to become a cloud provider with advantages of geographic distribution, resiliency, and scale through further monetization of existing customer connectivity without incurring substantial new Data Center investments. This technology may be important to service providers running out of compelling new services to sell to customers past the cost saturation point. The service provider can use geographic distribution to offload or optimize network loading, as well as to resell large-scale, low-cost computing and storage capacity.

The technology described herein can benefit the consumer by enabling reduced-cost, free, or income-producing broadband connectivity at home, school, or business through a beneficial rather than adversarial relationship with the service provider. The consumer sells computing, network, and storage capacity back to the service provider in the same way that consumers sell consumer-generated power back to the electrical utility.

The technology described herein can benefit local, state, and federal government interests in facilitating increased access to affordable broadband for consumers and businesses as well as lowering costs for industry/enterprise to access large-scale compute and storage resources. This technology also encourages network infrastructure investments that drive economic activity.

The technology described herein can benefit the environment by distributing compute load across endpoint facilities for which the space, power, and cooling impact is negligible as opposed to concentrated Data Center facilities that represent a high infrastructure impact in terms of real estate, water, ISP connectivity, fuel, heat, transport, and overall carbon footprint.

OTHER EXAMPLE EMBODIMENTS

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

We claim:

1. A method, comprising:
   logically partitioning, in each of a plurality of first party computing resources, each first party computing resource into a first party end user partition and a first party crowd-sourced cloud partition;
   installing a crowd-sourced cloud application in the first party crowd-sourced cloud partition of each first party computing resource; and
   orchestrating, by a cloud provider computing system and the crowd-sourced cloud application in the first party crowd-sourced cloud partition of each first party computing resource, cloud services over a communications network, wherein orchestrating comprises:

by the crowd-sourced cloud application in the first party crowd-sourced cloud partition of each first party computing resource, via the communications network:
registering at least one cloud service of the first party crowd-sourced cloud partition of the first party computing resource with the cloud provider;
receiving, from the cloud provider computing system, one or more requests for registered crowd-sourced cloud services;
provisioning each registered crowd-sourced cloud service requested by the cloud provider computing system in the first party crowd-sourced cloud partition of the first party computing resource; and
operating each provisioned service; and
by the cloud provider computing system,
publishing each registered cloud service as available to crowd-sourced cloud user computing systems;
receiving one or more requests for cloud services from a crowd-sourced cloud user computing system; and
requesting, from a crowd-sourced cloud application of a particular first party computing resource, a registered crowd-sourced cloud service responsive to the request for cloud services from the crowd-sourced cloud user computing system.

2. The method of claim 1, wherein the crowd-sourced cloud user computing system is an Internet application provider computing system, the cloud provider computing system is an Internet Service Provider (ISP) computing system, and each of the first party computing resources are ISP residential subscriber computing resources.

3. The method of claim 1, wherein the crowd-sourced cloud user computing system is an Internet application provider computing system, and wherein the cloud provider computing system and each of the first party computing resources are Internet Service Provider (ISP) residential subscriber computing resources.

4. The method of claim 1, wherein:
the crowd-sourced cloud user computing system is an Internet Service Provider (ISP) residential subscriber computing system, and the cloud provider computing system and each of the first party computing resources are ISP residential subscriber computing resources; and
the communications network is the Internet provided by the ISP.

5. The method of claim 1, wherein:
the crowd-sourced cloud user computing system is an Internet Service Provider (ISP) residential subscriber computing system, and the cloud provider computing system is an ISP residential subscriber computing resource of a separate subscriber to the ISP, and each of the first party computing resources are separate residential subscribers of the ISP; and
the communications network is the Internet provided by the ISP.

6. The method of claim 1, wherein:
the crowd-sourced cloud user computing system is an Internet Service Provider (ISP) residential subscriber computing system, and the cloud provider computing system and each of the first party computing resources are Internet Service Provider (ISP) residential subscriber computing systems other then the crowd-sourced cloud user computing system; and
the communications network is characterized by a spatial scope less than or equal to a local area network.

7. The method of claim 6, wherein the communications network comprises a Wi-Fi local area wireless computing network.

8. Logic encoded on one or more non-transitory computer storage media for execution and when executed operable to:
partition, in each of a plurality of first party computing resources, each first party computing resource into a first party end user partition and a first party crowd-sourced cloud partition;
install a crowd sourced cloud application in the first party crowd-sourced cloud partition of each first party computing resource; and
orchestrate, by a cloud provider computing system and the crowd-sourced cloud application in the first party crowd-sourced cloud partition of each first party computing resource, cloud services over a communications network, wherein orchestrating comprises:
by the crowd-sourced cloud application in the first party crowd-sourced cloud partition of each first party computing resource, via the communications network:
registering at least one cloud service of the first party crowd-sourced cloud partition of the first party computing resource with the cloud provider,
receiving, from the cloud provider computing system, one or more requests for registered crowd-sourced cloud services;
provisioning each registered crowd-sourced cloud service requested by the cloud provider computing system in the first party crowd-sourced cloud partition of the first party computing resource, and
operating each provisioned service; and
by the cloud provider computing system,
publishing each registered cloud service as available to crowd-sourced cloud user computing systems,
receiving one or more requests for cloud services from a crowd-sourced cloud user computing system, and
requesting, from a crowd-sourced cloud application of a particular first party computing resource, a registered crowd-sourced cloud service responsive to the request for cloud services from the crowd-sourced cloud user computing system.

9. The logic of claim 8, wherein the crowd-sourced cloud user computing system is an Internet application provider computing system, the cloud provider computing system is an Internet Service Provider (ISP) computing system, and each of the first party computing resources are ISP residential subscriber computing resources.

10. The logic of claim 8, wherein the crowd-sourced cloud user computing system is an Internet application provider, and wherein the cloud provider computing system and each of the first party computing resources are residential subscribers of an Internet Service Provider (ISP).

11. The logic of claim 8, wherein:
the crowd-sourced cloud user computing system is an Internet Service Provider (ISP) residential subscriber computing system, and the cloud provider computing system and each of the first party computing resources are ISP residential subscriber computing resources; and
the communications network is the Internet provided by the ISP.

12. The logic of claim 8, wherein:
the crowd-sourced cloud user computing system is an Internet Service Provider (ISP) residential subscriber computing system, and the cloud provider computing system is an ISP residential subscriber computing resource of a separate subscriber to the ISP, and each of the first party computing resources are separate residential subscribers of the ISP; and the communications network is the Internet provided by the ISP.

13. The logic of claim 8, wherein the crowd-sourced cloud user computing system is an Internet Service Provider (ISP) residential subscriber computing system, and the cloud provider computing system and each of the first party computing resources are Internet Service Provider (ISP) residential subscriber computing systems other then the crowd-sourced cloud user computing system the communications network is characterized by a spatial scope less than or equal to a local area network.

14. The logic of claim 13, wherein the communications network comprises a Wi-Fi local area wireless computing network.

15. A system, comprising:
a storage device; and
a processor communicatively coupled to the storage device, wherein the processor executes application code instructions that are stored in the storage device to cause the system to:
partition, in each of a plurality of first party computing resources, each first party computing resource into a first party end user partition and a first party crowd-sourced cloud partition;
install a crowd-sourced cloud application in the first party crowd-sourced cloud partition of each first party computing resource;
orchestrate, by a cloud provider computing system and the crowd-sourced cloud application in the first party crowd-sourced cloud partition of each first party computing resource, cloud services over a communications network, wherein orchestration comprises:
by the crowd-sourced cloud application in each first party crowd-sourced cloud partition of each first party computing resource, via the communications network:
registering at least one cloud service of the first party crowd-sourced cloud partition of the first party computing resource with the cloud provider,
receiving, from the cloud provider computing system, one or more requests for registered crowd-sourced cloud services;
provisioning each registered crowd-sourced cloud service requested by the cloud provider computing system in the first party crowd-sourced cloud partition of the first party computing resource, and operating each provisioned service; and by the cloud provider computing system,
publishing each registered cloud service as available to crowd-sourced cloud user computing systems, and
receiving one or more requests for cloud services from a crowd-sourced cloud user computing system, and requesting, from a crowd-sourced cloud application of a particular first party computing resource, a registered crowd-sourced cloud service responsive to the request for cloud services from the crowd-sourced cloud user computing system.

16. The system of claim 15, wherein the crowd-sourced cloud user computing system is an Internet application provider computing system, the cloud provider computing system is an Internet Service Provider (ISP) computing system, and each of the first party computing resources are ISP residential subscriber computing resources.

17. The system of claim 15, wherein the crowd-sourced cloud user computing system is an Internet application provider, and wherein the cloud provider computing system and each of the first party computing resources are residential subscribers of an Internet Service Provider (ISP).

18. The system of claim 15, wherein:
the crowd-sourced cloud user computing system is an Internet Service Provider (ISP) residential subscriber computing system, and the cloud provider computing system and each of the first party computing resources are ISP residential subscriber computing resources; and
the communications network is the Internet provided by the ISP.

19. The system of claim 15, wherein:
the crowd-sourced cloud user computing system is an Internet Service Provider (ISP) residential subscriber computing system, and the cloud provider computing system is an ISP residential subscriber computing resource of a separate subscriber to the ISP, and each of the first party computing resources are separate residential subscribers of the ISP; and
the communications network is the Internet provided by the ISP.

20. The system of claim 15, wherein the crowd-sourced cloud user computing system is an Internet Service Provider (ISP) residential subscriber computing system, and the cloud provider computing system and each of the first party computing resources are Internet Service Provider (ISP) residential subscriber computing systems other then the crowd-sourced cloud user computing system the communications network is characterized by a spatial scope less than or equal to a local area network.

* * * * *

UNITED STATES PATENT AND TRADEMARK OFFICE
CERTIFICATE OF CORRECTION

| | | |
|---|---|---|
| PATENT NO. | : 9,952,908 B2 | Page 1 of 1 |
| APPLICATION NO. | : 14/851437 | |
| DATED | : April 24, 2018 | |
| INVENTOR(S) | : Plamen Nedeltchev and John Christopher Cottrell | |

It is certified that error appears in the above-identified patent and that said Letters Patent is hereby corrected as shown below:

On the Title Page (54) Title, correct title of invention to:
-- CROWD-SOURCED CLOUD COMPUTING --

Signed and Sealed this
Nineteenth Day of June, 2018

Andrei Iancu
*Director of the United States Patent and Trademark Office*